A. Straub,
Sawing Stone.
N° 14,072.   Patented Jan. 8, 1856.
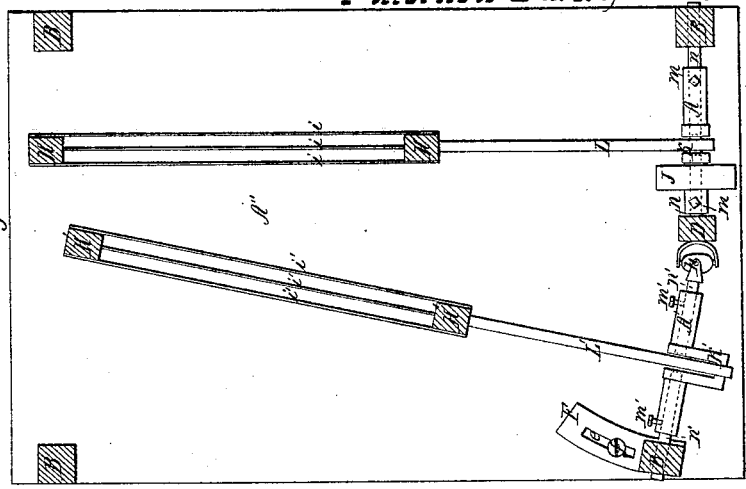
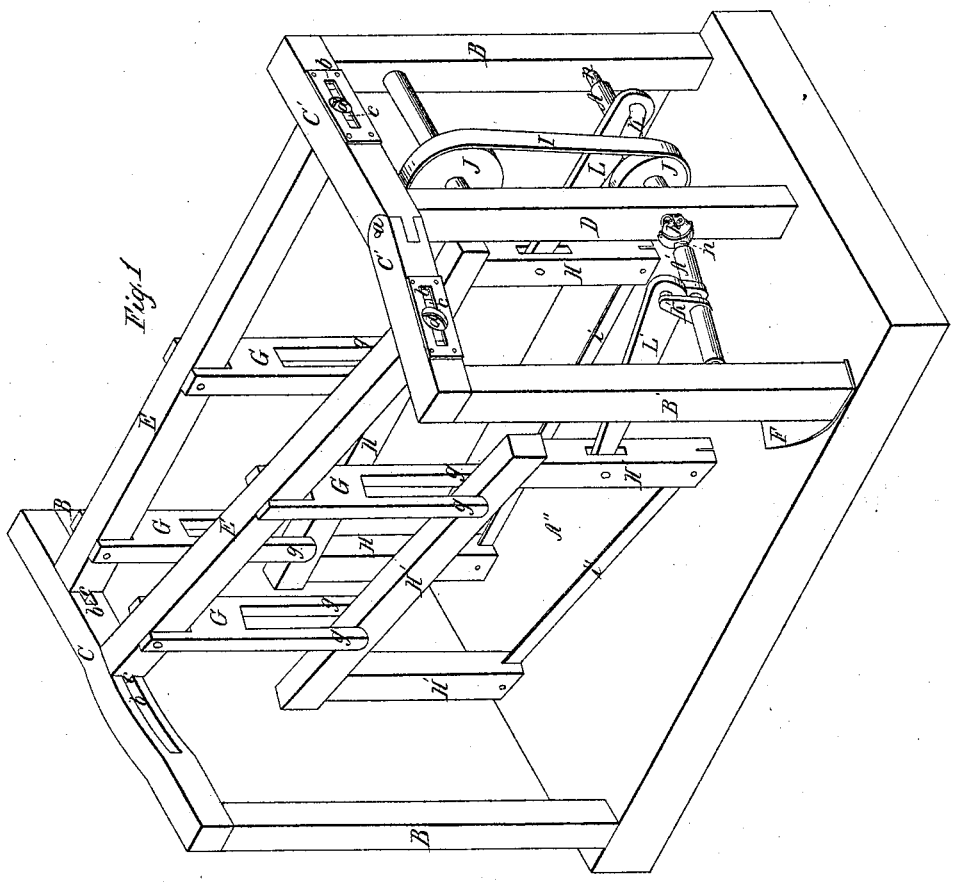

UNITED STATES PATENT OFFICE.

ABRAHAM STRAUB, OF MILTON, PENNSYLVANIA.

MACHINE FOR SAWING MARBLE OBELISKS.

Specification of Letters Patent No. 14,072, dated January 8, 1856.

*To all whom it may concern:*

Be it known that I, ABRAHAM STRAUB, of Milton, in the county of Northumberland and State of Pennsylvania, have invented certain new and useful Improvements in Machines for Sawing Stone into Wedge, Pyramidal, or Square Forms; and I do hereby declare the following to be a full, clear, and exact description of the same, reference being had to the accompanying drawings, making a part thereof, in which—

Figure 1, represents a perspective view, and Fig. 2, represents a horizontal section through the machine above the saws.

Similar letters where they occur in the two figures denote like parts.

The nature of my invention relates to the so hanging of saws, in a stone sawing machine as that they may cut in right lines, or so that one, two, or more of the cuts may converge toward the others, for the purpose of sawing the block into a wedge or pyramidal form as may be desired, and as will be now described.

A″, represents a base or bed upon which the block of stone to be operated upon is laid. From this base or bed, rises four corner posts B, B′, tied at their tops by the transverse pieces C, C′. One of the corner posts (B′,), at one end of the machine, is adjustable, the others are permanent, and to properly sustain one of the shafts which has fixed bearings, an intermediate post D, is introduced at what may be called the forward end of the machine.

The transverse piece C′, is hinged at *a*, so that, that part of it next the adjustable or movable post B′, may turn thereon. Two longitudinal pieces E, E, extend from one transverse piece to the other, and are adjustable therein by means of the slots *b*, into which suitable tenons *c*, pass and are held when adjusted by the set screws *d*.

The foot of the post B, is supported in a segmental piece of metal F, on the bed A″, and in said piece F, is a circular slot *e*, through which passes a set screw *f*, for holding it when adjusted. From the longitudinal pieces E, E, project downward, forked arms G, G, through the forks *g, g*, of which the gates or saw frames H, H′, reciprocate—said forks serving as guides to the saw frames.

At the front end of the machine in the upright posts, is supported the shaft A A′, which has a toggle or elastic joint *h* in it, so that one part A′, of the shaft may run oblique to the other part A. Power may be communicated to the shaft in any of the well known manners, and I have shown, simply for convenience, an endless belt I, passing over the pulleys J, J, for that purpose. Upon each of the two parts of the shaft A, A′, are arranged cranks K, K′, to which are respectively connected one end of the pitmen L, L′, the other ends of said pitman being connected to the saw gates or frames H, H′, which carry the saws *i, i′* as many as may be found desirable. The shafts A A′, are hollow, and shafts or journals *n, n′* are run into them, and held on them by set screws *m, m′*, and by this means the cranks which are a part of the shafts A, A′, may be so adjusted, as to vibrate their saws together, or to cause one to go forward while the other is drawn back, for the purpose of allowing their front parts to travel across each others path or cut, and to saw to as near a point as possible.

One half of the shaft (A) is hung in the posts B, D, and these may be rigid, so that the saws in the frame H, may run in a right line, and slab off, and thus save the outside or excess of stone. The other part of the shaft (A′) is hung at one end to the adjustable post B′, and at its other end, by the toggle *h*, to the shaft A, but so that it may run oblique to A, and run its gate or frame H′, and the saws in it in an oblique direction for making a wedge or pyramidal form. It is not necessary that both saws should run oblique to each other, or rather that both should be inclined from a right line, to cut an obelisk or pyramidal block, as all the inclination may be upon one side of the block, while the other side may be straight, for by so sawing it, and afterward dressing off the base and point of the piece, it will make a perfect tapered column, and much of the outside part of the original block may be thus sawed by sawing it into slabs.

One half of my machine may be permanent, and the other half adjustable to any desired inclination to the permanent half, the toggle or elastic joint in the crank shaft admitting of adjustment; and the cranks themselves may be adjusted in relation to each other, as they are independent of, or may be turned on the journals which support the shaft.

If the machine is to be set for cutting parallel cuts, with all its saws, the post B', is slipped around in its circular segment, until the two parts of the shaft A, A', are in line with each other, and it is then ready for ordinary work; the machine can as readily be set for oblique cuts, and the cranks being adjustable longitudinally on their inner shafts, they may be set to any ordinary size of block, and varied at pleasure; and by means of the adjustable frames and toggle joints, the machine may be duplicated, or any practical number of frames may be set in the series.

Having thus fully described, the nature of my invention, what I claim therein as new and desire to secure by Letters Patent is—

The combination of the divided, toggle-jointed shaft, with a hinged or adjustable section of the frame, so that two or more saw frames hung to, and driven by, said shaft may be worked in an inclined position to each other, but at right angles to the axis of motion and so that, the shaft, saw-gates, and their guides, as well as the sectional or hinged frame, may all be adjusted simultaneously, and held in adjustment, substantially as described.

A. STRAUB.

Witnesses:
JOHN MILLER,
CHAS. A. KUTZ.